United States Patent [19]

Kobayashi et al.

[11] Patent Number: 5,091,965

[45] Date of Patent: Feb. 25, 1992

[54] VIDEO IMAGE PROCESSING APPARATUS

[75] Inventors: Seiji Kobayashi, Tokyo, Japan; Demetri Psaltis, Pasadena, Calif.

[73] Assignees: Sony Corporation, Tokyo, Japan; California Institute of Technology, Pasadena, Calif.

[21] Appl. No.: 553,995

[22] Filed: Jul. 16, 1990

[51] Int. Cl.$^5$ .............................. G06K 9/00
[52] U.S. Cl. ................................. 382/15; 395/1
[58] Field of Search ............... 382/14, 15, 27, 28, 382/35, 41; 364/513

[56] References Cited

U.S. PATENT DOCUMENTS

| 4,707,859 | 11/1987 | Nudd et al. | 382/28 |
| 4,876,731 | 10/1989 | Loris et al. | 382/15 |
| 4,954,963 | 9/1990 | Penz et al. | 382/15 |
| 4,989,256 | 1/1991 | Buckley | 382/15 |

Primary Examiner—Leo H. Boudreau
Attorney, Agent, or Firm—Alvin Sinderbrand; William S. Frommer

[57] ABSTRACT

A video image processing apparatus in which an analog video image can be satisfactorily converted to a binary value by calculating theshold values of respective neurons and coupling coefficients of respective synapses of a neural network circuit on the basis of the input analog video image and a pre-determined function.

By arranging so a difference component E between the input analog video image and the binary value video image is defined as

$$E = (-\tfrac{1}{2}) \alpha^2 \sum_i \sum_j \mu_{(i)} P_{(i,j)} \mu_{(j)} + \alpha \sum_i \hat{g}_{(i)} \mu_{(i)} + C$$

where $\alpha$ is the coefficient, $u_{(i)}$ is the value which results from converting the input analog video image into the binary value, and $P_{(i,j)}$ is the value obtained from the function and $g_{(i)}$ is the value which is obtained from the function and the input analog video image, it is possible to convert the video image into the binary value by the use of the neural network circuit.

Further, by setting that the function to have a frequency characteristic of a human's eyes, it is possible to obtain a binary value video image which is excellent from a human's visual standpoint.

Furthermore, if the input analog video image is a computer hologram and the function is a window function which indicates a range of a desired video image in a reproduced image which results from Fourier-transforming the computer hologram, the noise in the range of the desired video image in the reproduced video image can be reduced to provide an excellent reproduced image.

3 Claims, 6 Drawing Sheets

VIDEO IMAGE PROCESSING APPARATUS

BACKGROUND OF THE INVENTION

1. Field of the Invention

The present invention generally relates to video image processing apparatus and, more particularly, to a video image processing apparatus in which an analog video image is converted to a binary value and a computer hologram is formed satisfactorily by processing the video image with the use of a neural network circuit.

2. Description of the Prior Art

When an analog video image is converted to a binary value, the number of picture elements (i.e., pixels) which form the analog video image are increased, for example, to twice the number of pixels in the vertical and horizontal directions so that each pixel is now expressed by four small pixels. As a result, five gradations of expression are possible for each set of four small pixels, that is, the small pixels are rendered either all white, one pixel is rendered black, two pixels are rendered black, three pixels are rendered black or all pixels are rendered black. The pixels of the analog video image are compared with four threshold values and converted to respective expressions of the five gradations in response to the compared outputs.

If conversion or quantization is simply performed as described above, the gradation of video image is changed in a stepwise fashion thereby producing a so-called quasi-contour, thus resulting in a considerable degrading of the quality of the video image.

As a result, a prior art proposal removes the quasi-contour by mixing the analog video image with a desired noise component having no correlation to the analog video image. However, this method results in a lower signal-to-noise (S/N) ratio of the video image so that good image quality is not obtained.

Further, when a so-called computer hologram is formed, the computer hologram is output in binary form, although it is formed from an analog value. As a result, quantization noise occurs which causes the S/N ratio of a reproduced picture to be deteriorated considerably.

OBJECTS AND SUMMARY OF THE INVENTION

Accordingly, it is an object of the present invention to provide an improved video image processing apparatus which can eliminate the aforenoted shortcomings and disadvantages of the prior art.

More specifically, it is another object of the present invention to provide a video image processing apparatus in which an analog video image is converted to a binary value and a computer hologram is formed satisfactorily by processing the video image with the use of a neural network circuit.

The above, and other objects, features and advantages of the present invention, will be apparent in the following detailed description of a preferred embodiment of the invention when read in conjunction with the accompanied drawings.

According to an aspect of the present invention, a video image processing apparatus is comprised of an input device for receiving an analog video image, a sampling device for sampling the received analog video image, a neural network circuit having a plurality of neurons which are connected together through respective synapses, a setting device for setting a predetermined function, a first computing device for computing respective threshold values for each of the neurons of the neural network circuit on the basis of the sampled value image and the predetermined function and a second computing device for computing respective coupling coefficients for each of the synapses of the neural network circuit on the basis of the predetermined function in which, the neural network circuit processes the threshold values and the coupling coefficients so as to form a binary video image.

DETAILED DESCRIPTION OF A PREFERRED EMBODIMENT

A video image processing apparatus according to an embodiment of the present invention will now be described in detail with reference to the figures.

Figure 1:
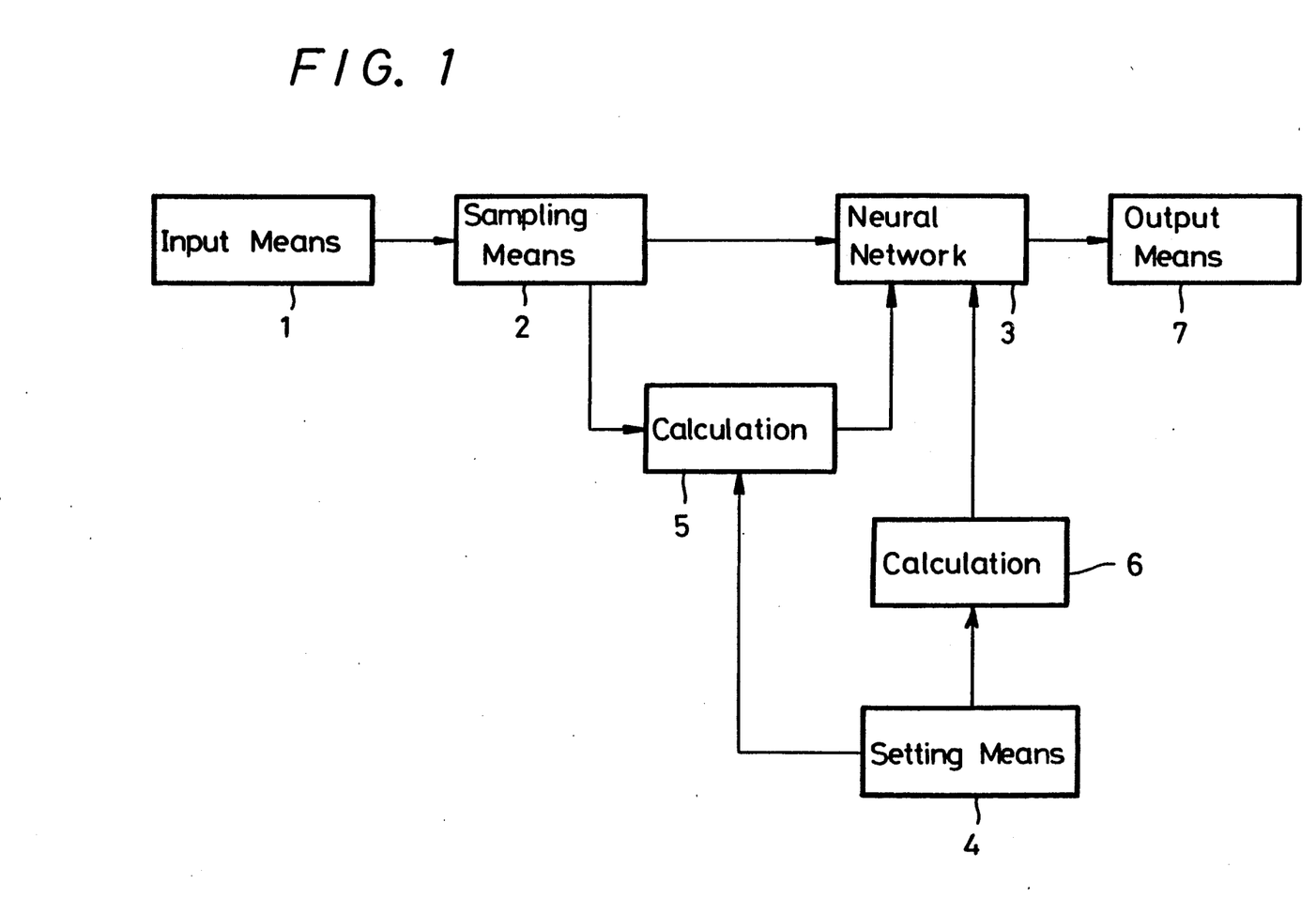
FIG. 1 is a function block diagram showing a video image processing apparatus according to the present invention.

An analog video image signal is supplied through an input device 1 to a sampling device 2, as shown in FIG. 1, in which the image signal is sampled according to horizontal and vertical scannings in a manner similar to that used in television scanning, to extract values of respective pixels.

A neural network circuit 3, for example, a Hopfield type neural network circuit which will be more fully described hereinafter, is provided with preferably four times as many neurons as the number of sampled pixels corresponding to the small pixels in the previously described prior art conversion.

Further shown in FIG. 1 is a function setting device 4 in which a predetermined function is set which, for example, has a frequency which corresponds to a frequency characteristic of a human's eyes. The function set in the function setting device 4 and the values of respective pixels sampled by the sampling device 2 are supplied to a computing device 5 which computes threshold values for respective neurons of the neural network circuit 3. The function set in the function setting device 4 is also supplied to a computing device 6 which computes coupling coefficients for synapses of the neural network circuit 3.

Processing is performed in the neural network circuit 3, afterward converged values formed in the respective neurons are supplied to an output device 7 as an output binary video image signal.

Alternatively, the value of each pixel sampled by the sampling device 2 may be compared with a desired threshold value whereupon the compared output may be supplied to each neuron of the neural network circuit 3 as an initial value.

As a result, the input analog video image from the input device 1 is converted to a binary value.

More specifically, assume that a human's image focusing system is incoherent. A resultant image $\hat{g}_{(m)}$ is provided by multiplying an original video image $g_{(m)}$ by a filter having a characteristic of a human's eyes, $W_{(f)}$, which is fundamentally a low-pass filter.

Substituting the Fourier transform of $W_{(f)}$, which is represented as $w_{(m)}$, yields the following equation (1):

$$\hat{g}_{(m)} = g_{(m)} * w_{(m)} \tag{1}$$

where * represents the convolution.

On the other hand, assume that $u_{(m)}$ represents a binary video image and $\alpha \hat{u}_{(m)}$ represents the binary video image as focused on the retinas of a human's eyes, in which $\alpha$ represents a coefficient selected by the video image. $\hat{u}_{(m)}$ may be expressed as follows:

$$\hat{u}_{(m)} = u_{(m)} * w_{(m)} \tag{2}$$

An object of the present invention is to convert an analog video image into a binary value so that the difference, as formed on the retinas of a human's eyes, between the binary video image and the original video image is minimized.

An error energy E may be defined as:

$$E = \sum_m |\hat{g}_{(m)} - \alpha \hat{u}_{(m)}|^2 \tag{3}$$

Substituting equation (2) into the equation (3) yields the following expression:

$$E = \sum_m |\hat{g}_{(m)} - \alpha u_{(m)} * w_{(m)}|^2 \tag{4}$$

$$= \sum_m |\hat{g}_{(m)}|^2 + \alpha^2 \sum_m (u_{(m)} * w_{(m)})^2 - 2\alpha \sum_m \hat{g}_{(m)} u_{(m)} * w_{(m)}$$

Further, assume that $$u_{(m)} * w_{(m)} = \sum_i u_{(i)} w_{(m-i)}$$

Substituting the above expression into equation 4 yields the following equation (5):

$$E = \sum_m |\hat{g}_{(m)}|^2 + \tag{5}$$

$$\alpha^2 \sum_m \sum_i \sum_j u_{(i)} u_{(j)} w_{(m-i)} w_{(m-j)} - 2\alpha \sum_m \sum_i \hat{g}_{(m)} u_{(i)} w_{(m-i)}$$

Further, assume that $$C = \sum_m |\hat{g}_{(m)}|^2 + \alpha^2 \sum_m |w_{(m)}|^2$$

$$P_{(i,j)} = \begin{cases} -2 \sum_m w_{(m-i)} w_{(m-j)} & \text{if: } i \neq j \\ 0 & \text{if: } i = j \end{cases}$$

$$\hat{g}_{(m)}^* = 2 \sum_m \hat{g}_{(i)} w_{(i-m)}$$

then, substituting the above expressions into equation 5 produces the following expression for the error energy E:

$$E = (-\tfrac{1}{2}) \alpha^2 \sum_i \sum_j u_{(i)} P_{(i,j)} u_{(j)} + \alpha \sum_i \hat{g}_{(i)} u_{(i)} + C$$

Figure 2A:
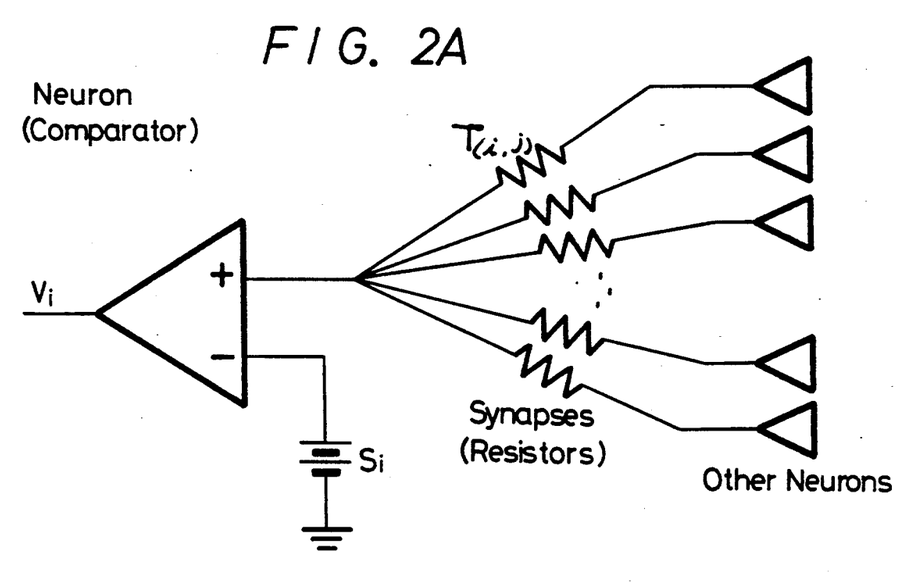
FIG. 2A is a schematic diagram showing an example of a Hopfield type neural network circuit.

The Hopfield type neural network circuit 3 may, for example, be constructed as shown in FIG. 2A, in which a neuron is formed as a comparator and synapses are formed as resistors, see U.S. Pat. Nos. 4,660,166 (Hopfield) and 4,719,591 (Hopfield et al.). In this situation, $S_{(i)}$ is a threshold value of a neuron, $V_{(i)}$ is an output of the neural network circuit and $T_{(i,j)}$ is a coupling coefficient between respective neurons. The output $V_{(i)}$ may be expressed as:

$$V_{(i)} = \begin{cases} +1 & \text{if: } \sum_j T_{(i,j)} V_{(j)} \geq S_{(i)} \\ -1 & \text{if: } \sum_j T_{(i,j)} V_{(j)} < S_{(i)} \end{cases}$$

Figure 2B:
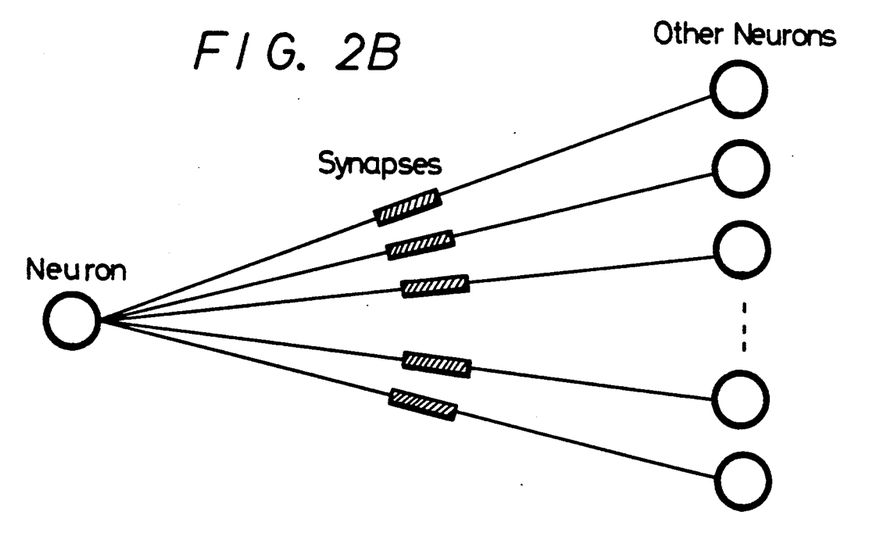
FIG. 2B is a schematic diagram showing an arrangement of neurons.

This circuit may be schematically represented as shown in FIG. 2B. If, however, five neurons are provided, then the neural network circuit is constructed as shown in FIG. 3.

Figure 3:
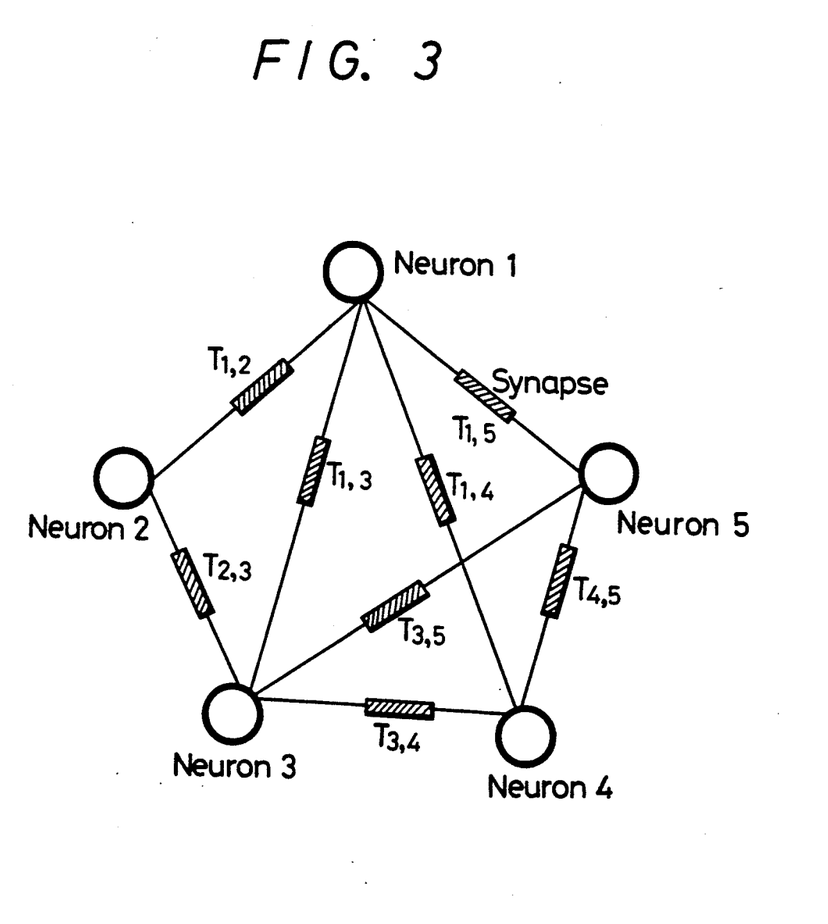
FIG. 3 is schematic diagram which is used to explain a neural network circuit of the present invention.

If the coupling coefficient of synapses which return to the same neuron is 0 and the coupling coefficients between the neurons are equal to each other, then the neural network circuit shown in FIG. 3 operates so as to minimize the error energy E which, in turn, may be expressed as:

$$E = -\tfrac{1}{2} \sum_i \sum_j u_{(i)} T_{(i,j)} u_{(j)} + \sum_i u_{(i)} S_{(i)} \tag{7}$$

Accordingly, as is to be appreciated from equations 6 and 7, if in the above described apparatus the threshold values $S_{(i)}$ of respective neurons in the neural network circuit 3 are computed by the computing device 5 on the basis of the value $g_{(m)}$ sampled by the sampling device 2 and the function $w_{(m)}$ set in the setting device 4, and the coupling coefficients $T_{(i,j)}$ of respective synapses of the neural network circuit 3 are computed by the computing device 6, the analog video image is converted into a binary value which has a relatively minimal error as observed on the retinas of a human's eyes.

In a preferred embodiment of the above described apparatus, the calculations required in neural network circuit 3 are performed by a computer.

Figure 4:
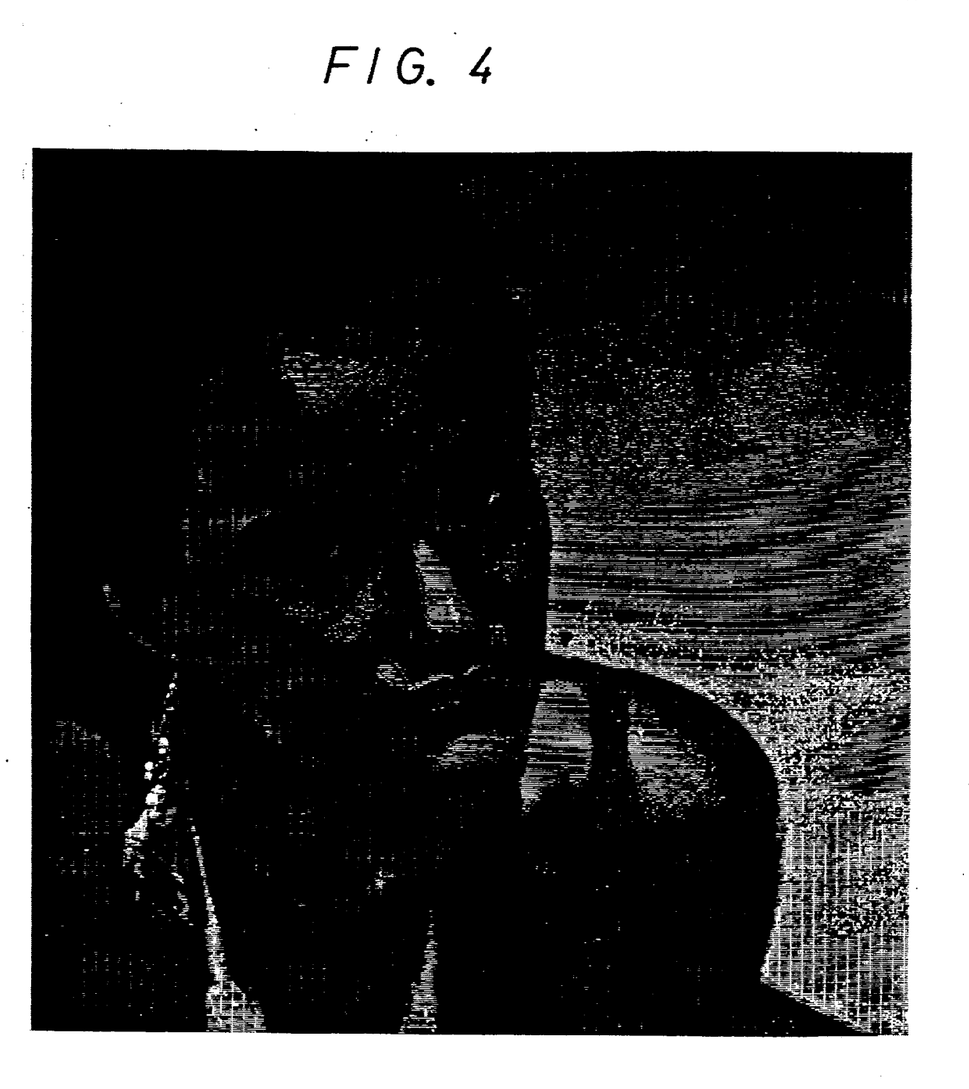
FIG. 4 is an example of a binary video image produced in accordance with a conventional method.
Figure 5:
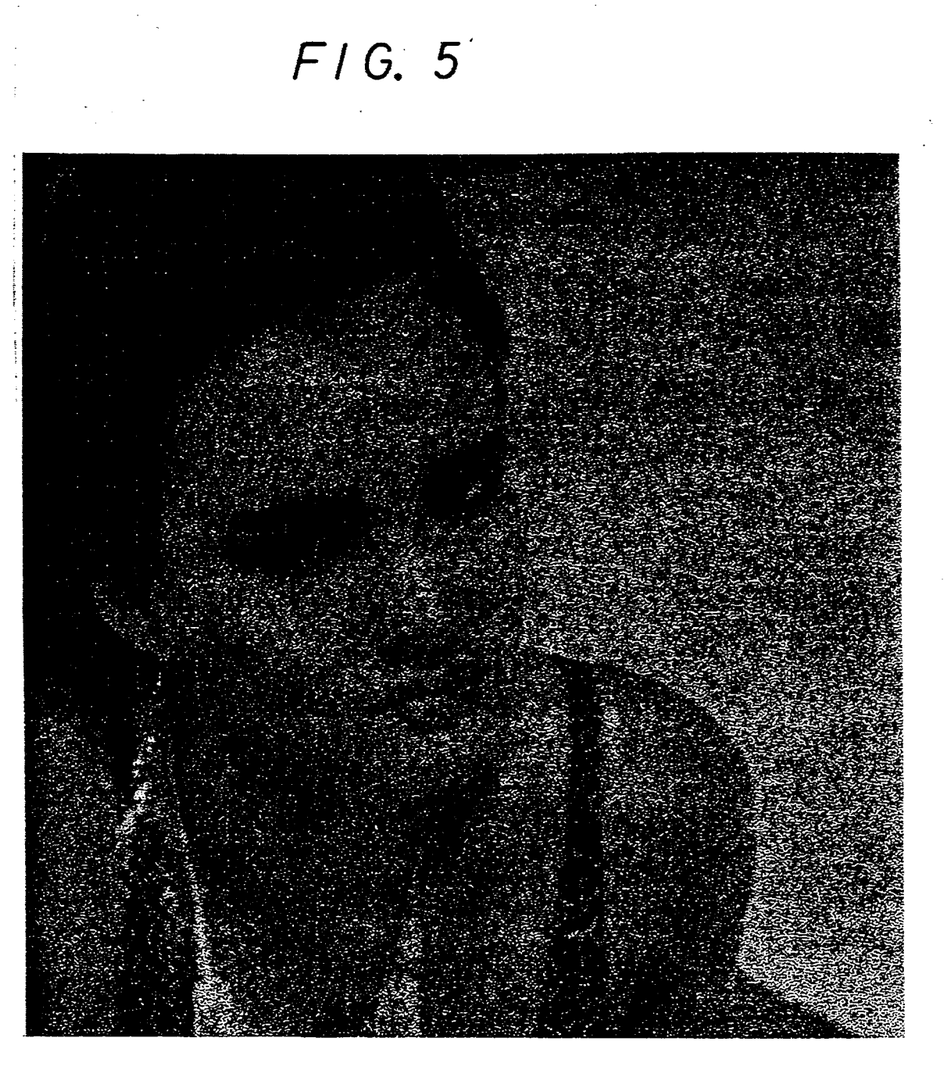
FIG. 5 is an example of a binary video image produced using the video image processing apparatus of the present invention.

FIGS. 4 and 5 show actual examples of binary value video images in which an original picture having 480×480 pixels is converted into a binary video image having 960×960 pixels. Have specifically, FIG. 4 shows an example of a binary video image produced in accordance with a prior art method, whereas FIG. 5 shows a binary video image of excellent quality formed by the apparatus of the present invention.

The formation of a computer hologram will now be described.

In formulating a computer hologram, video image information is Fourier-transformed and the Fourier-transformed analog value is converted into a corresponding binary value, which is then recorded as a hologram. Accordingly, the video image Fourier-transformed represents a hologram spectrum. Therefore, the computer hologram converts an analog waveform Fourier-transformed into a binary value in which the hologram spectrum represents a desired portion. However, in the prior art, it is frequently observed that if an analog video image is converted into a binary value by a simple slice level, quantization noise occurs which causes the S/N ratio to be deteriorated.

Therefore, assume that $G_{(k)}$ represents a signal on a spectrum surface, that is, a reproduced video image. Further, assume that an area from which noise is to be removed on the spectrum surface can be expressed by a window function $W_{(k)}$, which may, for example, be expressed as:

$$W_{(k)} = \begin{cases} 1 & \text{if noise is to be removed from the area} \\ 0 & \text{if noise is permitted in the area} \end{cases}$$

Further, assume that noise is to be removed from a portion in which the signal $G_{(k)}$ is defined. That is, $$W_{(k)} = 1 \text{ if } G_{(k)} \neq 0 \qquad (a)$$

in which $g_{(m)}$ represents the Fourier transform of the signal $G_{(k)}$. Since $g_{(m)}$ is typically a complex number, it can not be recorded directly. Therefore, instead of $g_{(m)}$, $$b_{(m)} \in \{+1, -1\}$$

is recorded. As a result, a signal appearing on the spectrum surface becomes $B_{(k)}$, instead of the ideal signal $G_{(k)}$, in which $B_{(k)}$ is the Fourier transform of $b_{(m)}$.

An object of the present invention is to make $b_{(m)}$ so as to minimize the difference between $B_{(k)}$ and $G_{(k)}$.

Accordingly, the error energy E is defined as follows:

$$E = \sum_k |W_{(k)} \{G_{(k)} - \alpha B_{(k)}\}|^2 \qquad (b)$$

According to Parseval's theorem, the above-mentioned definition yields:

$$E = \sum_m |g_{(m)} - \alpha w_{(m)} * b_{(m)}|^2 \qquad (c)$$

In this case, it is assumed that $G_{(k)}$ and $W_{(k)}$ satisfy a conjugate symmetric relationship relative to the original point. That is, $$G_{(k)} = G^*_{(k)} \text{ and } W_{(k)} = W^*_{(k)}$$

At that time, Fourier transforms $g_{(m)}$ and $w_{(m)}$ become real numbers.

Arranging the energy function E by the use of this relationship yields:

$$E = -\frac{1}{2} \alpha^2 \sum_i \sum_j b_{(i)} P_{(i,j)} b_{(j)} + \alpha \sum_i b_{(i)} \hat{g}_{(i)} + C \qquad (d)$$

where:

$$P_{(i,j)} = \begin{cases} -2 \sum_m w_{(i-m)} w_{(j-m)} & \text{if: } i \neq j \\ 0 & \text{if: } i = j \end{cases}$$

$$\hat{g}_{(i)} = -2 \sum_m g_{(m)} w_{(m-i)}$$

Accordingly, on the basis of equation (d) and equation (7) of the Hopfield type neural network circuit, $\hat{g}_{(i)}$ assumes a threshold value of each neuron, $P_{(i,j)}$ assumes a coupling coefficient of each synapse and $b_{(i)}$ assumes an output of each neuron. As such, it is possible to minimize the error energy E by using the neural network circuit.

Figure 6A:
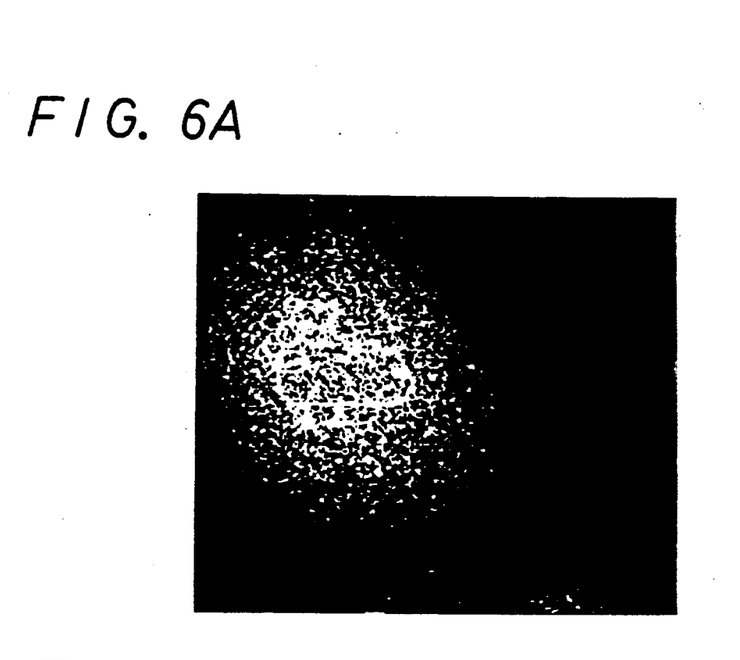
FIG. 6A is an example of a reproduced picture of a computer hologram produced in accordance with a prior art method.
Figure 6B:
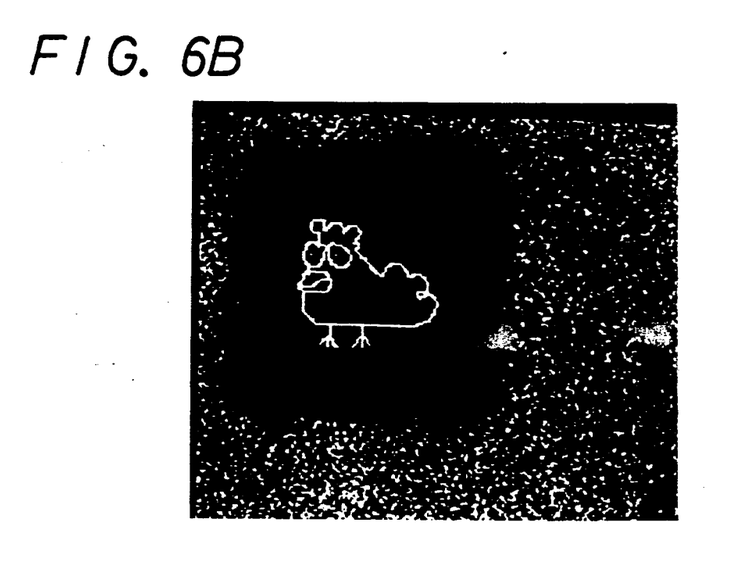
FIG. 6B is an example of a reproduced picture of a computer hologram produced using the present invention.

FIGS. 6A and 6B illustrate actual examples of reproduced video images of computer holograms. More specifically, FIG. 6A shows a reproduced video image of the prior art in which the S/N ratio is considerably deteriorated, whereas, as shown in FIG. 6B, an excellent reproduced video image can be produced from the video image processing apparatus of the present invention, in which noise is reduced in the desired portion of the video image.

As described above, according to the video image processing apparatus of the present invention, a video image is processed by the use of the neural network circuit, whereby the analog video image can be satisfactorily converted into a binary value and a computer hologram can be satisfactorily formed.

According to the above-described video image processing apparatus, the threshold values of the respective neurons and the coupling coefficients of the respective synapses in the neural network circuit are computed on the basis of the incoming analog video image and a predetermined function as previously described.

The difference component E between the incoming analog video image and the binary video image is defined as:

$$E = (-\tfrac{1}{2}) \alpha^2 \sum_i \sum_j \mu_{(i)} P_{(i,j)} \mu_{(j)} + \alpha \sum_i \hat{g}_{(i)} \mu_{(i)} + C$$

where $\alpha$ represents the coefficient, $u_{(i)}$ represents the value which results from converting the incoming analog video image into the binary value, $P_{(i,j)}$ represents the value which is obtained from the function and $\hat{g}_{(i)}$ is the value which is obtained from the function and the input analog video image. As a result, it is possible to convert the input analog video image into the binary value by using the neural network circuit.

Further, by setting the function to have the frequency characteristic of a human's eyes, it is then possible to obtain a binary video image which is excellent from a human's visual standpoint.

Further, if the incoming analog video image is a computer hologram and the function is a window function which indicates the range of the desired image of the reproduced video image which, in turn, results from Fourier-transforming the computer hologram, the noise in the range of the desired image in the reproduced video image can be reduced and an excellent reproduced video image can be obtained.

Having described a preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention:

1. A video image processing apparatus for converting an analog video image to a binary video image, said apparatus comprising:
   input means for receiving said analog video image in the form of a computer hologram;
   sampling means for sampling the received analog video image;
   a neural network circuit having a plurality of neurons which are connected together through respective synapses;
   setting means for setting a predetermined function which is a window function indicative of a range of a desired area of a reproduced video image which results from Fourier-transforming said computer hologram;
   first computing means for computing respective threshold values for each of said neurons in said neural network circuit on the basis of the sampled value of the video image and said predetermined function; and
   second computing means for computing respective coupling coefficients for each of said synapses of said neural network circuit on the basis of said predetermined function;
   said neural network circuit processing said threshold values and said coupling coefficients so as to form said binary video image.

2. A video image processing apparatus for converting an analog video image to a binary video image, said apparatus comprising:
   input means for receiving said analog video image;
   sampling means for sampling the received analog video image;
   a neural network circuit having a plurality of neurons which are connected together through respective synapses;
   setting means for setting a predetermined function which has a frequency characteristic corresponding to that of a human's eye;
   first computing means for computing respective threshold values for each of said neurons in said neural network circuit on the basis of the sampled value of the analog video image and said predetermined function; and
   second computing means for computing respective coupling coefficients for each of said synapses of said neural network circuit on the basis of said predetermined function;
   said neural network circuit processing said threshold values and said coupling coefficients so as to form said binary video image.

3. A video image processing apparatus according to claim 3; wherein said predetermined function is denoted by a low-pass filter characteristic.

* * * * *